United States Patent
Miller et al.

(10) Patent No.: US 6,676,136 B2
(45) Date of Patent: Jan. 13, 2004

(54) FLEXIBLE WATERSTOP RING

(75) Inventors: Michael R. Miller, Churubusco, IN (US); James W. Skinner, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 0 days.

(21) Appl. No.: 09/933,959

(22) Filed: Aug. 21, 2001

(65) Prior Publication Data

US 2003/0038429 A1 Feb. 27, 2003

(51) Int. Cl.[7] .................. F16L 21/02; F16L 17/03
(52) U.S. Cl. ............... 277/617; 277/602; 277/615; 277/616
(58) Field of Search ................. 277/602, 603, 277/605, 609, 615–617

(56) References Cited

U.S. PATENT DOCUMENTS

| | | | | |
|---|---|---|---|---|
| 2,451,070 A | * | 10/1948 | Chamberlain | 277/617 |
| 3,386,745 A | * | 6/1968 | Hein | 277/615 |
| 3,498,623 A | * | 3/1970 | Rowe | 277/605 |
| 3,575,430 A | * | 4/1971 | Alpine | 277/615 |
| 3,592,491 A | * | 7/1971 | Glover | 285/230 |
| 3,647,229 A | * | 3/1972 | Grimes | 277/615 |
| 3,787,061 A | * | 1/1974 | Yoakum | 277/605 |
| 3,831,950 A | * | 8/1974 | Bentley et al. | 277/649 |
| 4,084,827 A | * | 4/1978 | Wolf | 277/625 |
| 4,213,619 A | * | 7/1980 | Arlt et al. | 277/616 |
| 4,297,780 A | * | 11/1981 | Temple | 29/451 |
| 4,387,900 A | * | 6/1983 | Ditcher et al. | 29/235 |
| 4,487,421 A | * | 12/1984 | Housas et al. | 277/616 |
| 4,621,941 A | | 11/1986 | Ditcher et al. | 404/26 |
| 4,702,645 A | * | 10/1987 | Skinner et al. | 405/184.2 |
| 4,711,455 A | | 12/1987 | Ditcher et al. | 277/9.5 |
| 4,732,397 A | | 3/1988 | Gavin | 277/207 A |
| 4,737,220 A | | 4/1988 | Ditcher et al. | 156/218 |
| 4,746,127 A | | 5/1988 | Westhoff et al. | 277/1 |
| 4,890,863 A | | 1/1990 | Westhoff et al. | 285/39 |
| 4,903,970 A | | 2/1990 | Ditcher et al. | 277/9.5 |
| 5,054,794 A | | 10/1991 | Westhoff et al. | 277/1 |
| 5,114,162 A | * | 5/1992 | Ditcher | 277/605 |
| 5,286,040 A | * | 2/1994 | Gavin | 277/606 |
| 5,529,312 A | | 6/1996 | Skinner et al. | 277/9.5 |
| 5,876,039 A | * | 3/1999 | Skinner et al. | 277/617 |
| 6,173,997 B1 | * | 1/2001 | Nordstrom et al. | 285/139.1 |
| 2002/0153668 A1 | * | 10/2002 | Deeb et al. | 277/606 |

* cited by examiner

Primary Examiner—Anthony Knight
Assistant Examiner—Michael J. Kyle
(74) Attorney, Agent, or Firm—Baker & Daniels

(57) ABSTRACT

A waterstop ring provides a flexible joint connection between a pipe and a concrete structure. The waterstop ring includes an annular waterstop member projecting from an outer circumference thereof, and a pair of annular shoulder portions respectively disposed on each side of the waterstop member. The waterstop member and each of the shoulder portions each include hollow annular cavities defined therein, such that when the waterstop ring is installed in a connection between a concrete structure and a pipe, and partially embedded within the concrete structure, the annular cavities allow deformation of the waterstop ring and thereby allow tilting movement of the pipe in a direction away from the central axis of the pipe.

16 Claims, 6 Drawing Sheets

FIG_2

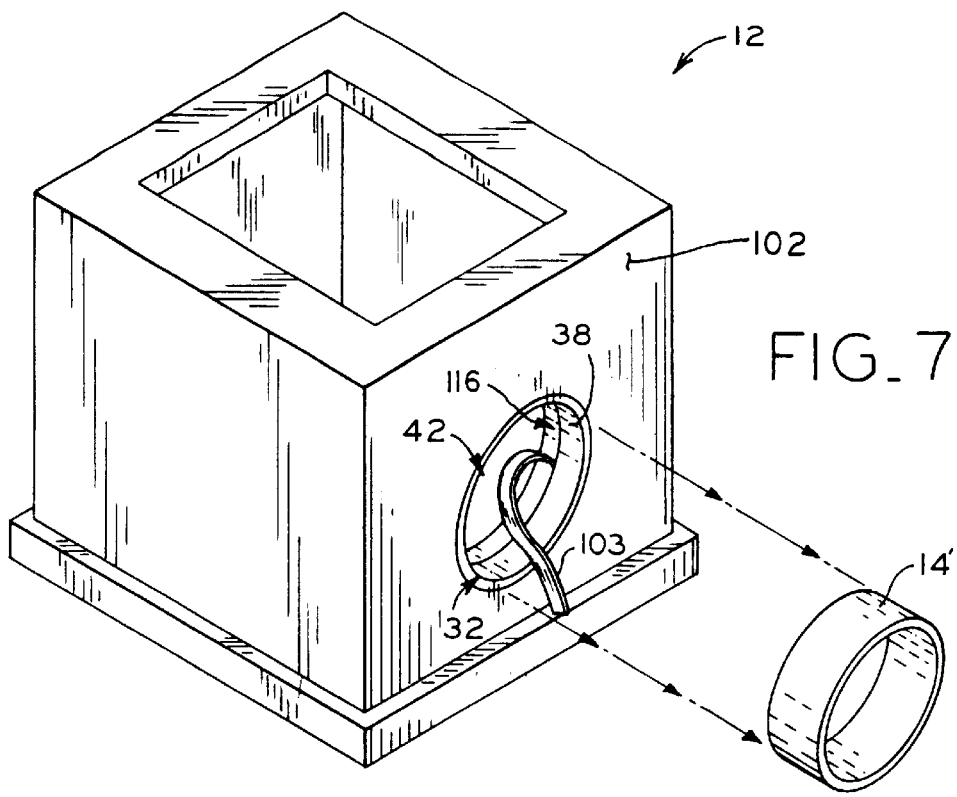
FIG_7
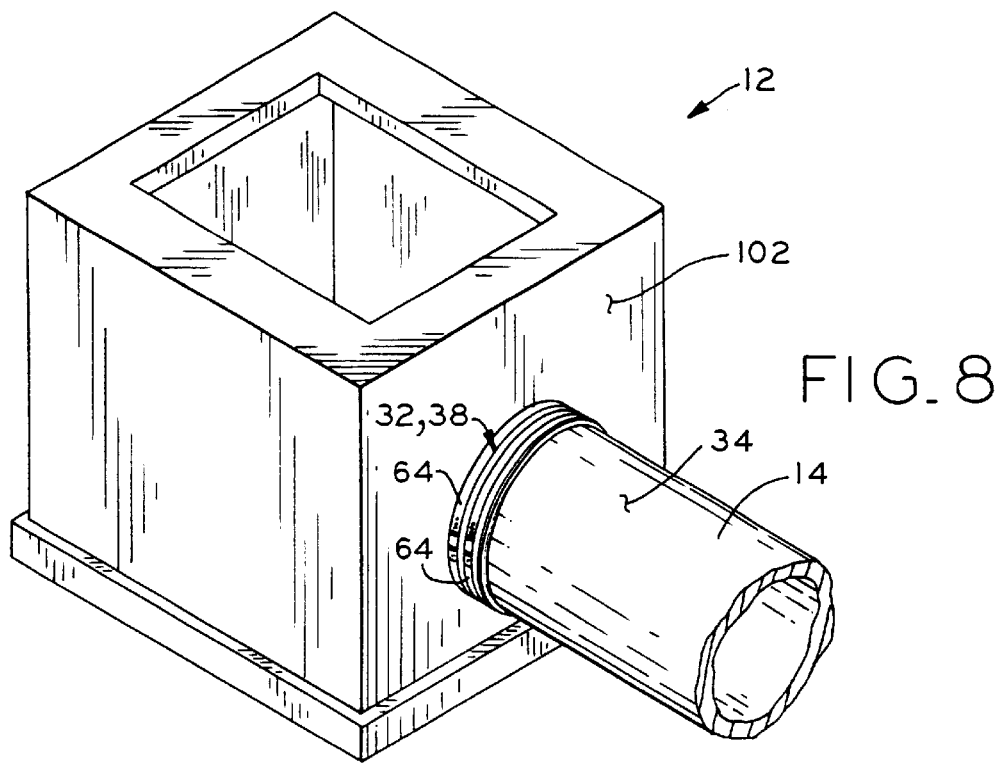
FIG_8

FLEXIBLE WATERSTOP RING

BACKGROUND OF THE INVENTION

1. Field of the Invention

The present invention relates to connections between pipes and concrete structures, and in particular, the present invention relates to waterstop rings, which provide a watertight connection between pipes and concrete structures.

2. Description of the Related Art

Waterstop rings are designed to provide watertight sealing connections between pipes and concrete structures, such as connections between pipes and precast concrete manholes, or any other concrete structures to which pipes may be connected. Typically, to install a waterstop ring in such a connection, the waterstop ring is first placed over the outside surface of a pipe, and one or more clamp rings are tightened around the waterstop ring to sealingly secure the waterstop ring around the outer surface of the pipe. The pipe, with the waterstop ring attached thereto, is then positioned within an opening in the concrete structure with the waterstop ring in the middle of the wall thickness of the concrete structure. Thereafter, mortar or grout is filled or cast between the opening and the waterstop ring to embed the waterstop ring within the mortar upon curing of same. The waterstop ring prevents water from passing between the waterstop ring and the pipe, and also presents a barrier in the form of a tortuous path to block the passage of water through the mortar from one side of the concrete structure to another.

For example, in FIG. 1, a prior connection 10 between concrete structure 12 and pipe 14 is shown. Pipe 14, with waterstop ring 16 attached thereto, is installed within opening 18 of concrete structure 12 as described above, with mortar 20 cast within opening 18 and filling the space between pipe 14 and opening 18 such that waterstop ring 16 is embedded within mortar 20. Waterstop ring 16 includes a series of annular undulations 22 as well as an annular waterstop member 24, which together present a tortuous path to prevent water from passing through mortar 20 around waterstop ring from one side of concrete structure 12 to another. However, as may be seen from FIG. 1, connection 10 between pipe 14 and concrete structure 12 is a rigid connection which, disadvantageously, does not allow any movement of pipe 14 in a direction away from central axis 26 of pipe 14. Therefore, any forces applied to pipe 14 could possibly result in cracking of mortar 20, separation of waterstop ring 16 from the outer surface of pipe 14, or any other failure of watertight connection 10 between pipe 14 and concrete structure 12.

What is needed is a waterstop ring which improves upon the foregoing, in order to reduce the possibility of failure of the watertight connection between a pipe and a concrete structure.

SUMMARY OF THE INVENTION

The present invention provides a flexible waterstop ring which allows a flexible joint to be established between a pipe and a concrete structure. The waterstop ring includes an annular waterstop member projecting from an outer circumference thereof, and a pair of annular shoulder portions respectively disposed on each side of the waterstop member. The waterstop member and each of the shoulder portions each include hollow annular cavities defined therein, such that when the waterstop ring is installed in a connection between a concrete structure and a pipe, and partially embedded within mortar cast between an opening of the concrete structure and the pipe, the annular cavities allow deformation of the waterstop ring and thereby allow movement of the pipe in a tilting manner away from the central axis of the pipe.

A head portion of the waterstop ring includes the waterstop member and the flexible shoulder portions, and the waterstop ring additionally includes an annular tail portion connected to the head portion by an undulating portion. The tail portion includes a pair of clamping surfaces thereon to which at least one clamping ring may be seated and clamped to sealingly attach the tail portion of the waterstop ring to the outer surface of a pipe.

To install the waterstop ring to provide a flexible joint between a pipe and a concrete structure, the waterstop ring is first placed about a mandrel, with the tail portion folded within the central opening of the waterstop ring such that the tail portion is disposed between the head portion of the waterstop ring and the outer surface of the mandrel. Thereafter, the mandrel and waterstop ring are positioned within an opening in a concrete structure such that the head portion of the waterstop ring is disposed in the middle of the wall thickness of the concrete structure. Mortar is then poured or cast within the opening between the concrete structure and the waterstop ring, and allowed to cure. The mandrel is then removed, and the tail portion of the waterstop ring is unfolded from the central opening thereof to project from one side of the concrete structure externally of the mortar. A pipe is then fittingly inserted within the central opening of the waterstop ring, and at least one clamping ring is seated on the clamping surfaces of the tail portion and tightened to provide a firm sealing connection between the tail portion and the outer surface of the pipe. Alternatively, the waterstop ring may be integrally cast within a monolithically poured concrete structure for later shipment of the concrete structure to an installation location where a pipe is attached thereto, or, a concrete structure may be monolithically cast around the waterstop ring and pipe at an on-site location.

Additionally, a waterstop ring is provided for use with corrugated pipe, in which the tail section of the waterstop ring includes an annular ridge adapted to be seated in one of the recessed portions of the corrugated pipe. The tail section additionally includes a pair of clamping surfaces respectively disposed on each side of the annular ridge, such that when the ridge is positioned within a recessed portion of the corrugated pipe, the clamping surfaces are located against the projecting portions of the pipe which are disposed on each side of the recessed portions, thereby allowing the clamping rings to be tightened on the waterstop ring against the projecting portions of the corrugated pipe.

Advantageously, when the waterstop ring is installed in a connection between a pipe and a concrete structure, the annular hollow cavities in the waterstop member and in the flexible shoulder portions thereof allow the waterstop ring to flex, thereby allowing tilting movement of the pipe in a any direction radially away from the central axis of the pipe. In this manner, a flexible joint connection is created between the pipe and the concrete structure in which some tilting movement of the pipe is allowed, in order to reduce the possibility of stress failure of the connection. Additionally, the undulating portion of the waterstop ring may expand and compress to allow axial movement of the pipe relative to the concrete structure along the longitudinal axis of the pipe.

As with known waterstop rings, the present waterstop ring also sealingly engages the outer surface of the pipe to prevent the passage of water therebetween, and the waterstop member and shoulder portions of the waterstop ring also present a barrier in the form of a tortuous path to prevent the passage of water through the mortar from one side of the concrete structure to another.

In one form thereof, the present invention provides a flexible waterstop ring for providing a connection between a concrete structure and a pipe which has a central axis, including an annular head portion having an inner circumference and an outer circumference; and a pair of axially spaced annular shoulder portions projecting from the outer circumference, each shoulder portion having at least one annular cavity therein, wherein when the pipe is connected to the concrete structure with the waterstop ring partially embedded within the concrete structure, the at least one annular cavity allows deformation of the waterstop ring to thereby allow tilting movement of the pipe in a direction away from the central axis of the pipe.

In another form thereof, the preset invention provides a flexible joint connection, including a concrete structure having an opening therein; a pipe disposed through the opening, the pipe having an outer surface and a central axis; and a flexible waterstop ring disposed around the outer surface of the pipe and at least partially embedded within the concrete structure around the opening, the waterstop ring having a pair of axially spaced annular shoulder portions projecting radially outward from an outer circumference thereof, each of the shoulder portions defining at least one first annular hollow cavity therein, whereby the hollow cavities of the shoulder portions allow the shoulder portions to flex, thereby allowing tilting movement of the pipe in a direction away from the central axis.

In another form thereof, the present invention provides a concrete structure, including at least one wall formed of concrete; and a flexible, annular waterstop ring around which the concrete wall is cast, the waterstop ring including an annular head portion having an outer circumference and an inner circumference, the inner circumference defining an opening through the concrete wall, the head portion of the waterstop ring further including a pair of annular shoulder portions projecting radially outward from the outer circumference thereof which are embedded in the wall, each of the shoulder portions defining at least one first annular hollow cavity therein, whereby the hollow cavities of the shoulder portions allow the shoulder portions to flex.

In another form thereof, the present invention provides a method of casting a concrete structure, including the steps of providing a flexible, annular waterstop ring including a central opening, and an annular head portion attached to an annular tail portion, the head portion further including a pair of annular shoulder portions projecting radially outward from an outer circumference thereof, each of the shoulder portions defining at least one first annular hollow cavity therein, whereby the hollow cavities of the shoulder portions allow the shoulder portions to flex; folding the tail portion of the waterstop ring inwardly into the central opening; casting a concrete wall around the waterstop ring, the central opening of the waterstop ring defining an opening in the concrete wall; unfolding the tail portion outwardly of the central opening, wherein the tail portion projects outwardly of the wall; and inserting a pipe through the waterstop ring.

In a further form thereof, the present invention provides a flexible waterstop ring for providing a connection between a concrete structure and a corrugated pipe having a central axis and an outer surface defined by plurality of alternating, annular recesses and protrusions, including an annular head portion having an outer circumference; an annular tail portion connected to the annular head portion and having an inner circumference, the tail portion further including an annular ridge projecting radially inward from the inner circumference, the ridge adapted to be fitted within an annular recess of the pipe; and a pair of annular shoulder portions projecting radially outward from the outer circumference, each shoulder portion having at least one annular cavity therein, wherein when the pipe is connected to the concrete structure with the waterstop ring partially embedded within the concrete structure, the annular cavities allow deformation of the waterstop ring to thereby allow tilting movement of the pipe in a direction away from the central axis of the pipe.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 7 is a is a perspective view of a concrete structure with the waterstop ring of FIGS. 5 and 6 embedded therein, further showing removal of the pipe section and the strip of foam material; and FIG. 8 is a perspective view of the concrete structure of FIG. 7, showing the tail portion of the waterstop ring folded outwardly, a pipe disposed through the waterstop ring, and a pair of clamping rings securing the tail portion of the waterstop ring to the pipe.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION

Figure 3:
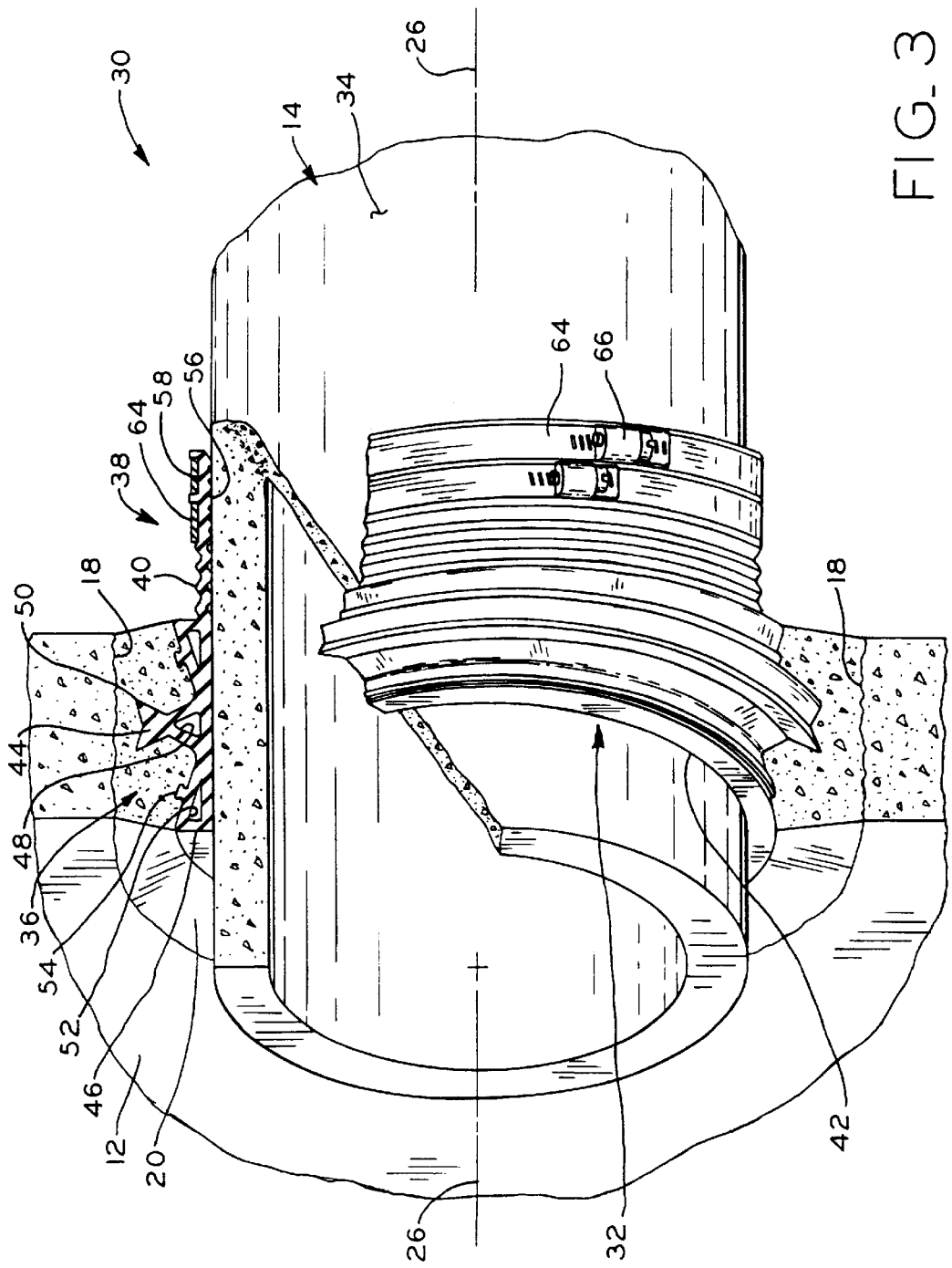
FIG. 3 is a partial sectional view of the completed flexible joint connection of FIG. 2, including a pipe fittingly inserted through the central opening of the waterstop ring, and a pair of clamping rings clamped around the tail portion of the waterstop ring.

Referring first to FIG. 3, flexible joint connection 30 is shown between pipe 14 and concrete structure 12, including waterstop ring 32 sealingly fitted about outer surface 34 of pipe 14, and at least partially embedded within mortar 20 which has been placed, poured, or cast within opening 18 of concrete structure 12. Concrete structure 12 may be a manhole riser, a pre-cast concrete structure, or any other concrete structure having an opening for attachment of a pipe.

Waterstop ring 32 is made of any suitable water-resistant, flexible material, which material may also have a high memory and relatively low compression set, such as a thermoplastic, or any natural or synthetic rubber such as nitrile, neoprene, polyisoprene, or natural/polyisoprene rubbers, for example. Waterstop ring 32 is typically formed by extrusion, followed by cutting the extrusion to a desired length and splicing the ends of the cut extruded piece together to thereby form the waterstop annulus. However, where the diameter of waterstop ring 32 is relatively small, waterstop ring may be molded into annular form.

Waterstop ring 32, when viewed in cross section as in FIG. 3, generally includes head portion 36 and tail portion 38, which is connected to head portion 36 by undulating portion 40. Undulating portion 40 may elongate or compress, allowing head portion 36 and tail portion 38 to move toward and away from one another along central axis 26 of waterstop ring 32. Head portion 36 includes a relatively smooth inner circumference adapted to sealingly abut the outer surface 34 of pipe 14, with the inner circumference defining central opening 42 of waterstop ring 32 through which pipe 14 may be inserted.

Head portion 36 of waterstop ring 32 includes waterstop member 44 and a pair of axially spaced shoulder portions 46, wherein each of the foregoing project radially outwardly from an outer circumference of head portion 36 of waterstop ring 32. Waterstop member 44 generally includes first annular hollow cavity 48 and a pair of first waterstop projections 50. Shoulder portions 46 each generally include second annular hollow cavities 52 and second waterstop projections 54. Tail portion 38 of waterstop ring 32 generally includes undulating sealing surface 56 disposed around the inner circumference thereof, and a pair of clamping surfaces 58 disposed around the outer circumferences thereof.

Figure 1:
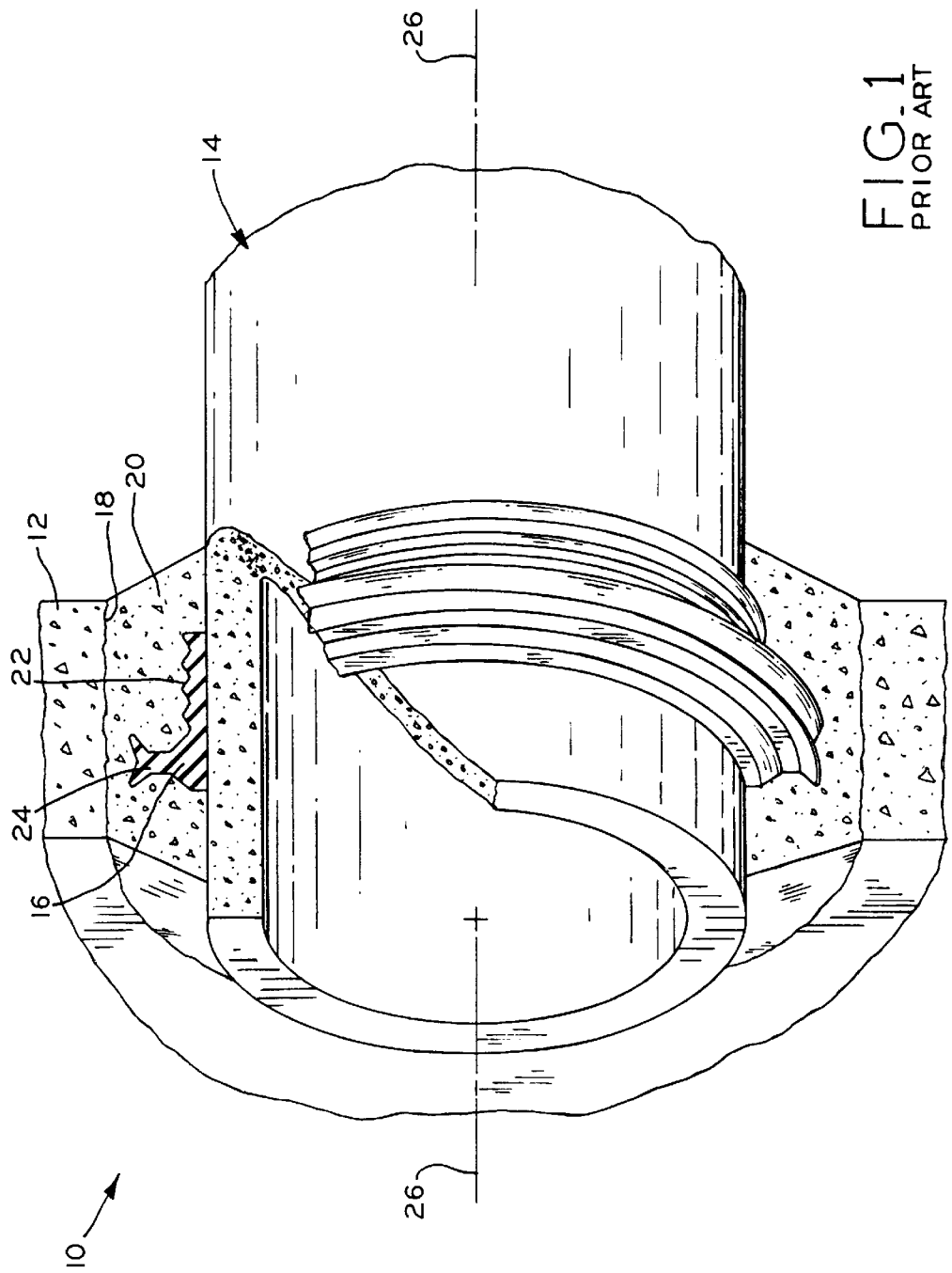
FIG. 1 is a partial sectional view of a prior connection between a pipe and a concrete structure, showing a prior waterstop ring disposed around the outer surface of the pipe and embedded within mortar which is disposed between the pipe and the concrete structure.
Figure 2:
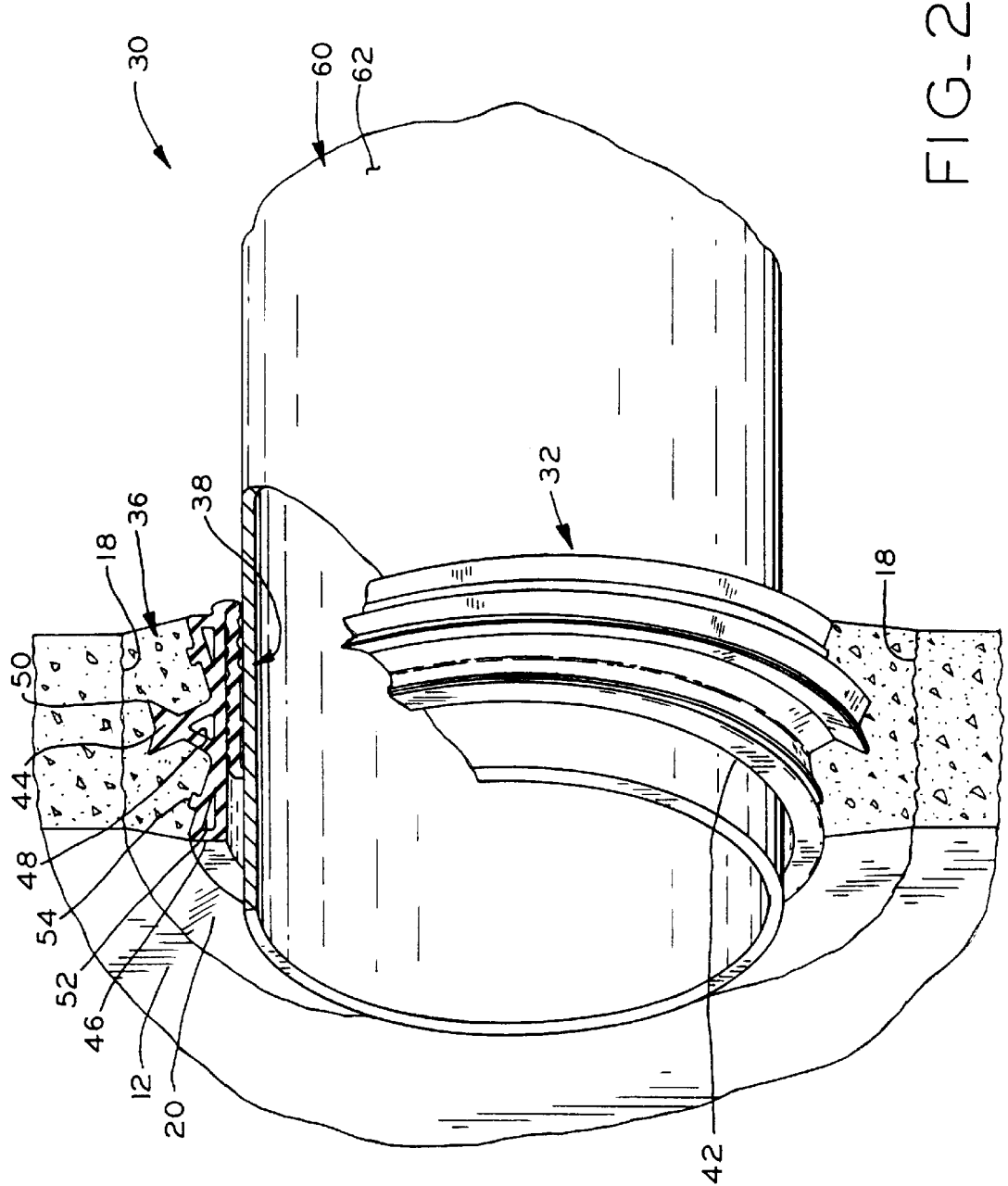
FIG. 2 is a partial sectional view showing a stage in the installation of a flexible joint connection between a pipe and a concrete structure, including a waterstop ring in accordance with the present invention, a mandrel inserted through the folded waterstop ring, and mortar placed, poured or cast within the space between the waterstop ring and the opening in the concrete structure.

Next, referring to FIGS. 2 and 3, the installation of waterstop ring 32 in flexible joint connection 30 in order to provide a flexible, watertight connection between pipe 14 and concrete structure 12, will now be described according to one embodiment of the invention. Referring first to FIG. 2, tail portion 38 of waterstop ring 32 is folded inwardly about undulating portion 40 into central opening 42 of waterstop ring 32 as shown, and mandrel 60 is inserted within central opening 42 of waterstop ring 32, with tail portion 38 disposed between head portion 36 and outer surface 62 of mandrel 60. Mandrel 60 is then positioned within opening 18 of concrete structure 12 such that waterstop ring 32 is positioned in the middle of the wall thickness of concrete structure 12. Then, mortar or grout 20 is poured or cast within the space between waterstop ring 32 and opening 18 of concrete structure 12 and allowed to cure, such that waterstop member 44 and shoulder portions 46 of waterstop ring 32 are embedded within mortar 20.

Thereafter, mandrel 60 is removed from central opening 42 of waterstop ring 32, and tail portion 38 of waterstop ring 32 is unfolded from central opening 42, such that tail portion 38 projects from one side of concrete structure 12 externally of mortar 20, as shown in FIG. 3. Referring now to FIG. 3, pipe 14 is then fittingly inserted through central opening 42 of waterstop ring 32, with the inner circumference of head portion 44 of waterstop ring 32 sealingly fitting against outer surface 34 of pipe 14, and tail portion 38 of waterstop ring 32 loosely abutting outer surface 34 of pipe 14. At least one clamping ring 64 is then placed around the outer circumference of tail portion 38 on clamping surfaces 58 thereof. Clamping ring 64 is then tightened by a torque wrench, for example, at fittings 66 to clamp tail portion 38 firmly against outer surface 34 of pipe 14, such that sealing ridges 56 of tail portion 38 deform thereagainst to provide a watertight seal between tail portion 38 of waterstop ring 32 and outer surface 34 of pipe 14.

Figure 5:
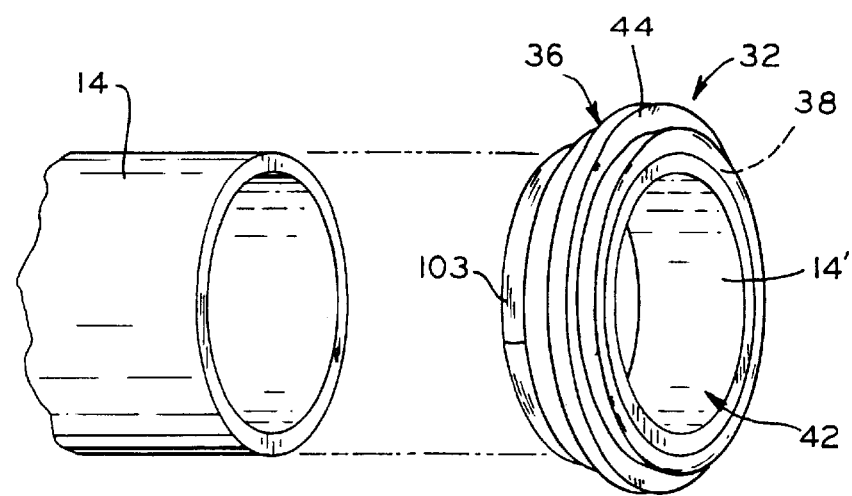
FIG. 5 is a perspective view of pipe and a pipe section which has been cut from the pipe, and a waterstop ring folded around the pipe section with a strip of foam material disposed around the pipe section adjacent the waterstop ring.

Alternatively, as shown in FIGS. 5–8, waterstop ring 32 may be cast into a precast, monolithic concrete structure 12 to which pipe 14 is connected, as shown in FIG. 8. Referring first to FIG. 5, a pipe section 14' is cut from pipe 14, and waterstop ring 32 is fitted therearound, with tail portion 38 of waterstop ring 32 folded inwardly about undulating portion 40 into central opening 42 of waterstop ring 32, and disposed between head portion 36 of waterstop ring 32 and section 14' of pipe 14. As shown in FIG. 5, section 14' of pipe 14 functions as a mandrel for waterstop ring 32 during the casting of concrete structure 12. The length of section 14' of pipe 14 may correspond to the thickness of wall 102 (see FIG. 8) of concrete structure 12, for example. A strip of foam material 103 may be wrapped around the outer periphery of pipe section 14' adjacent head portion 36 of waterstop ring 32 when the length of head portion 36 of waterstop ring 32 is less than the thickness of wall 102 of concrete structure 12, in order to provide an annular relief area 116 (see FIG. 7) within concrete structure 12, as described below.

Figure 6:
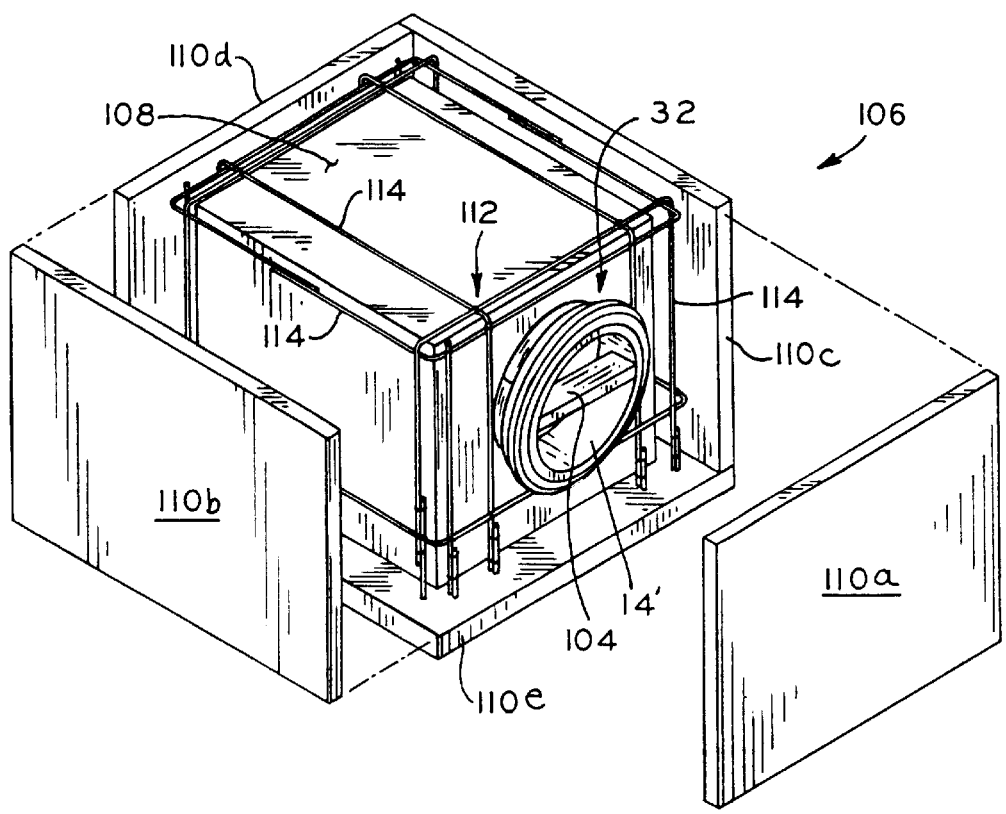
FIG. 6 is a perspective view of the pipe section and waterstop ring of FIG. 5 mounted within a form structure.

Referring now to FIG. 6, brace 104 is inserted across the central opening of pipe section 14' to support same during the pouring of concrete when concrete structure 12 is cast. The folded waterstop ring 32, with pipe section 14' therein, is mounted within form structure 106 such that tail portion 38 thereof will unfold toward the outside of concrete structure 12 after concrete structure 12 is cast, as described below. Form structure 106 generally includes inner form 108, which may be made from pieces of wood or other suitable materials secured together. Form structure 106 also includes outer forms 110a–e, and reinforcing frame 112 of reinforcing bars 114 disposed in the space between inner form 108 and outer forms 110a–e. After form structure 106 is assembled with waterstop ring 32 and pipe section 14' mounted therewithin, concrete is poured into the space between inner form 108 and outer forms 110a–e. Concrete structure 12 is formed upon curing of the concrete, with waterstop ring 32 and reinforcing frame 112 embedded within concrete structure 12. Thereafter, inner form 108 and outer forms 110a–e are removed.

As shown in FIG. 7, after such disassembly of form structure 106, pipe section 14' is removed from central opening 42 of waterstop ring 32, and foam material 103 is removed from the opening in wall 102 of concrete structure 12 to define annular relief area 116. Thereafter, tail portion 38 of waterstop ring 32 is unfolded as shown in FIG. 8, such that tail portion 38 extends outwardly of wall 102 of concrete structure 12. Concrete structure 12 may then be transported to an installation site, at which pipe 14 is inserted within central opening 42 of waterstop ring 32, and at least one clamping ring 64 is paced around the outer circumference of tail portion 38 and tightened to provide a tight seal between tail portion 38 of waterstop ring and outer surface 34 of pipe 14 to form flexible joint connection 30 between pipe 14 and concrete structure 12.

Optionally, rather than monolithically casting a precast concrete structure 12 around waterstop ring 32 as described above, in which pipe section 14' is used as a mandrel, concrete structure 12 may be poured in place at any designated location in the field. For example, pipe 14 may be first inserted into waterstop ring 32 and at least one clamping ring 64 tightened around tail portion 38 thereof, followed by positioning pipe 14 and waterstop ring 32 within a form structure which has been assembled on location, such as within a trench dug in the ground. Concrete is then poured into the form structure, embedding waterstop ring 32 therein, followed by removal of the forms upon curing of the concrete to expose a poured-in-place concrete structure 12.

In flexible joint connection 30, and regardless of the manner in which same is formed between concrete structure 12 and pipe 14 as describe above, waterstop ring 32 provides a watertight connection between pipe 14 and concrete structure 12, in which the respective sealing engagements between head portion 36 and outer surface 34 of pipe 14, and between tail portion 38 and outer surface 34 of pipe 14, prevent the passage of water between waterstop ring 32 and pipe 14. Undulating portion 40 of waterstop ring 32, which connects head portion 36 and tail portion 38, allows movement of head portion 36 and tail portion 38 toward and away from one another, thus allowing axial movement of pipe 14 along the length of central axis 26 thereof. Additionally, shoulder portions 46, including second waterstop projections 54, as well as waterstop member 44, including first waterstop projections 50, present a tortuous path to any movement of water through mortar 20, in order to provide a barrier to the passage of water through mortar 20 from one side of concrete structure 12 to another.

Further, any movement of pipe 14 radially about central axis 26 thereof caused by any external stress on pipe 14 or movement of pipe 14 or concrete structure 12 due to settling, for example, deforms waterstop member 44 and shoulder portions 46 of waterstop ring 32 in the area of first and second annular hollow cavities 48, 52 thereof, respectively, such that first and second annular hollow cavities 48, 52 provide a take-up space to allow the deformation of head portion 36 of waterstop ring 32, and thus allow movement of pipe 14 in a tilting manner radially from central axis 26. For example, one end of pipe 14 may move in a first direction away from central axis 26 while the opposite end of pipe 14 concurrently moves in the opposite direction from central axis 26. Waterstop ring 32 allows pipe 14 to move radially or tilt up to 7° or more from central axis 26 thereof. In this manner, waterstop ring 32 provides a flexible joint 30 between pipe 14 and concrete structure 12 to reduce the possibility of failure of the watertight connection between pipe 14 and concrete structure 12.

Figure 4:
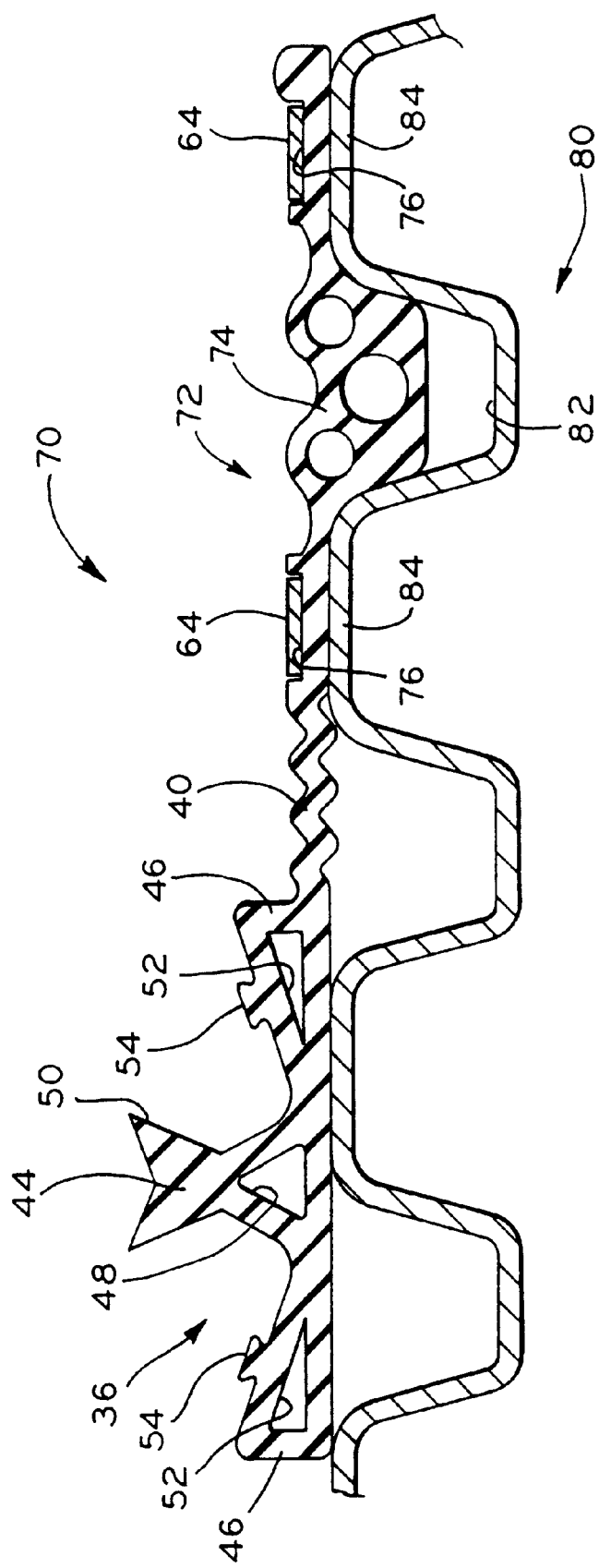
FIG. 4 is a sectional view, showing a portion of a length of corrugated pipe to which a waterstop ring in accordance with a second embodiment of the present invention has been attached.

In FIG. 4, another embodiment of a waterstop ring in accordance with the present invention is shown, which is adapted for use with corrugated pipe 80, which has an outer surface defined by a plurality of alternating recess portions 82 and projecting portions 84. Waterstop ring 70 includes head portion 36 which is identical to that of waterstop ring 32, and waterstop ring 70 is installed in a flexible joint connection between a pipe and a concrete structure in the same manner as that described above regarding waterstop ring 32. Tail portion 72 of waterstop ring 70 includes annular ridge 74 projecting radially inwardly from the inner circumference thereof, which is adapted to fit within recess portion 82 of a corrugated pipe 80, as shown in FIG. 4. Additionally, tail portion 72 of waterstop ring 70 includes a pair of clamping surfaces 76 disposed respectively on each side of ridge 74, such that when ridge 74 is positioned within a recess portion 82 of corrugated pipe 80, clamping surfaces 76 are located against projecting portions 84 of corrugated pipe 80. Thus, when clamping rings 64 are positioned around clamping surfaces 76 and tightened thereon, clamping rings 64 tighten against projecting portions 84 of corrugated pipe 80 to firmly seal tail portion 72 of waterstop ring 70 against corrugated pipe 80. Ridge 74 therefore provides a centering or locating feature to properly center clamping surfaces 76 atop projecting portions 84 of corrugated pipe 80.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flexible waterstop ring for providing a connection between a concrete structure and a pipe which has a central axis, comprising:

an annular head portion having an inner circumference and an outer circumference;

a pair of axially spaced annular shoulder portions projecting from said outer circumference, each said shoulder portion defining at least one annular cavity therein; and an annular waterstop member projecting from said outer circumference, said waterstop member disposed axially in between said shoulder portions, wherein when the pipe is connected to the concrete structure with said waterstop ring partially embedded within the concrete structure, said annular cavities allow deformation of said waterstop ring to thereby allow tilting movement of the pipe in a direction away from the central axis of the pipe.

2. The waterstop ring of claim 1, wherein said waterstop ring additionally includes an annular tail portion connected to said head portion, said tail portion including at least one clamping surface around an outer circumference thereof.

3. The waterstop ring of claim 2, wherein said head portion and said tail portion are connected by an annular undulating portion, said undulating portion allowing movement of said head and said tail portions toward and away from one another along said central axis of said pipe.

4. The waterstop ring of claim 2, wherein said tail portion additionally includes an annular ridge projecting from an inner circumference thereof, and a pair of said clamping surfaces disposed around said outer circumference on respective sides of said annular ridge.

5. The waterstop ring of claim 1, wherein each of said shoulder portions include at least one waterstop projection.

6. A flexible joint connection, comprising:

a concrete structure having an opening therein;

a pipe disposed through said opening, said pipe having an outer surface and a central axis; and a flexible waterstop ring disposed around said outer surface of said pipe and at least partially embedded within said concrete structure around said opening, said waterstop ring having a pair of axially spaced annular shoulder portions projecting radially outward from an outer circumference thereof, each of said shoulder portions defining at least one first annular hollow cavity therein, said cavities remaining at least partially open when said pipe is disposed through said opening, whereby said hollow cavities of said shoulder portions allow said shoulder portions to flex, thereby allowing tilting movement of said pipe in a direction away from said central axis.

7. The flexible joint assembly of claim 6, wherein said waterstop ring further includes at least one annular waterstop member disposed intermediate said shoulder portions, said at least one waterstop member defining at least one second hollow annular cavity therein.

8. The flexible joint assembly of claim 6, wherein said waterstop ring further includes an annular tail portion, said tail portion including at least one clamping surface around an outer circumference thereof.

9. The flexible joint assembly of claim 8, further including at least one annular clamping ring disposed around said tail portion to clamp said tail portion between said clamping ring and outer surface of said pipe.

10. The flexible joint assembly of claim 8, said head portion and said tail portion are connected by an annular undulating portion, said undulating portion allowing movement of said head and tail portions toward and away from one another along said longitudinal axis.

11. A concrete structure, comprising:

at least one wall formed of concrete; and a flexible, annular waterstop ring around which said concrete wall is cast, said waterstop ring including a central axis and an annular head portion having an outer circumference and an inner circumference, said inner circumference defining an opening through said concrete wall, said head portion of said waterstop ring further including a pair of axially spaced annular shoulder portions projecting radially outward from said outer circumference thereof which are embedded in said wall, each of said shoulder portions defining at least one first annular hollow cavity therein; and a pipe inserted through said opening with at least a portion of said hollow cavities of said shoulder portions remaining open to allow said shoulder portions to flex.

12. The concrete structure of claim 11, said pipe including an outer surface and a longitudinal axis, said pipe extending through said opening with said outer surface of said pipe in sealing engagement with said inner circumference of said waterstop ring, whereby flexing of said hollow cavities of said shoulder portions allow tilting movement of said pipe in a direction away from said longitudinal axis.

13. The concrete structure of claim 12, wherein said waterstop ring further includes an annular tail portion connected to said head portion, said tail portion including at least one clamping surface around an outer circumference thereof.

14. The concrete structure of claim 13, further including at east one annular clamping ring disposed around said tail portion to clamp said tail portion between said clamping ring and said outer surface of said pipe.

15. The concrete structure of claim 13, wherein said head portion and said tail portion are connected by an annular undulating portion, said undulating portion allowing movement of said head and tail portions toward and away from one another along said longitudinal axis.

16. A flexible waterstop ring for providing a connection between a concrete structure and a corrugated pipe having a central axis and an outer surface defined by plurality of alternating, annular recesses and protrusions, comprising:

an annular head portion having an outer circumference;

an annular tail portion connected to said annular head portion and having an inner circumference, said tail portion further including an annular ridge projecting radially inward from said inner circumference, said ridge adapted to be fitted within an annular recess of the pipe;

a pair of axially spaced annular shoulder portions projecting radially outward from said outer circumference, each shoulder portion defining at least one annular cavity therein; and an annular waterstop member projecting from said outer circumference, said waterstop member disposed axially in between said shoulder portions, wherein when the pipe is connected to the concrete structure with said waterstop ring partially embedded within the concrete structure, said annular cavities allow deformation of said waterstop ring to thereby allow tilting movement of the pipe in a direction away from the central axis of the pipe.

* * * * *